Oct. 6, 1964         W. A. PATTERSON         3,151,965
METHOD AND APPARATUS FOR PRODUCING GLASS BEADS
Filed Jan. 27, 1961                    2 Sheets-Sheet 1
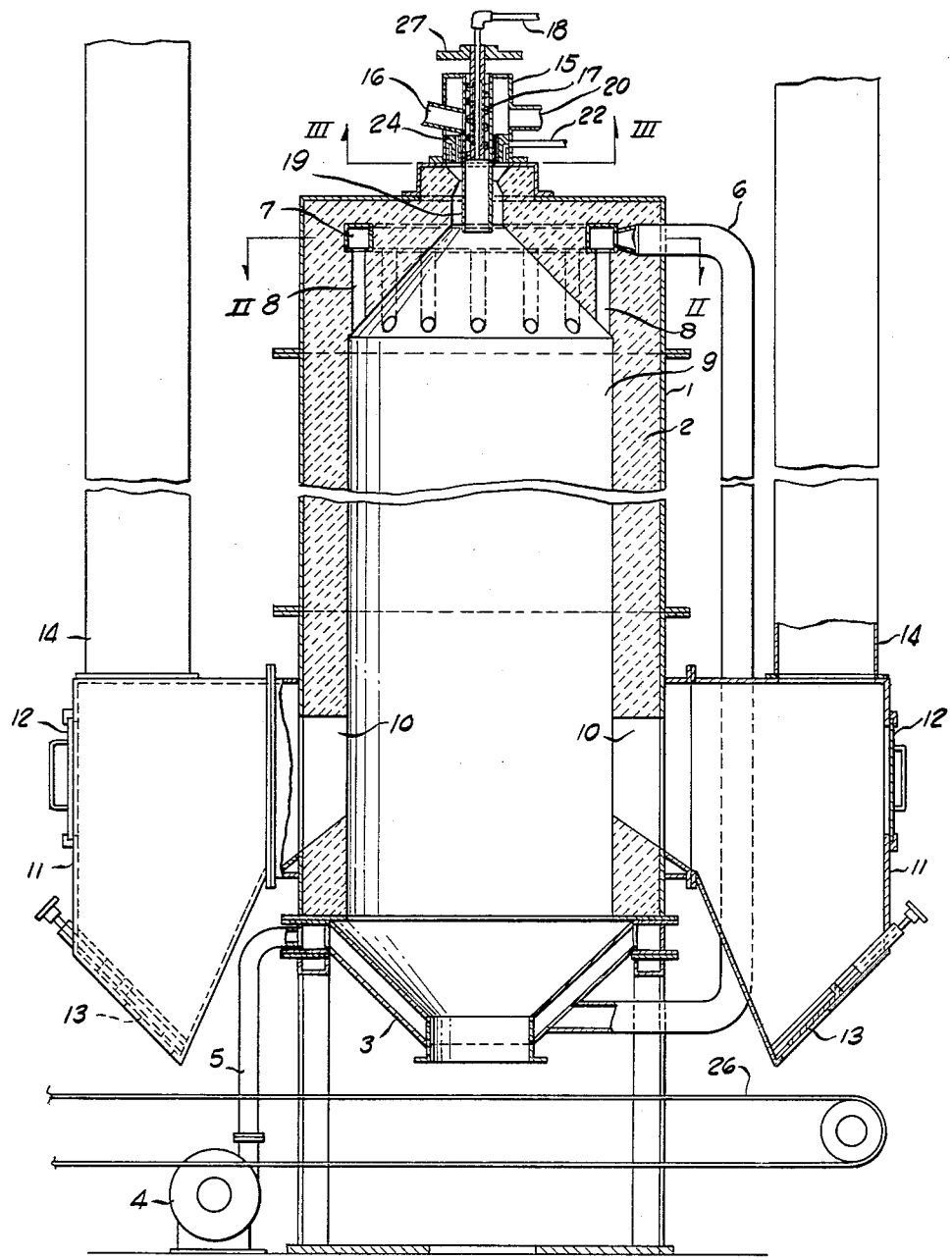
Fig. I
INVENTOR
WILLIAM A. PATTERSON
BY Lloyd F. Engle, Jr.
ATTORNEY Oct. 6, 1964   W. A. PATTERSON   3,151,965
METHOD AND APPARATUS FOR PRODUCING GLASS BEADS
Filed Jan. 27, 1961   2 Sheets-Sheet 2
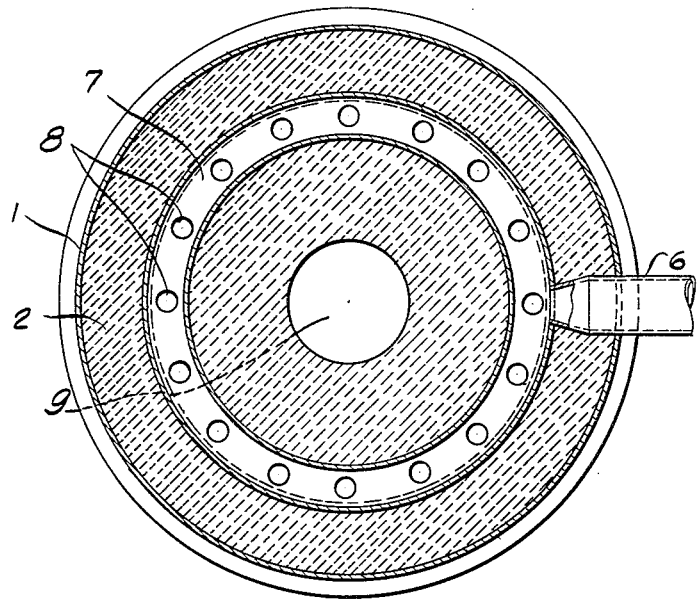
*Fig. II*
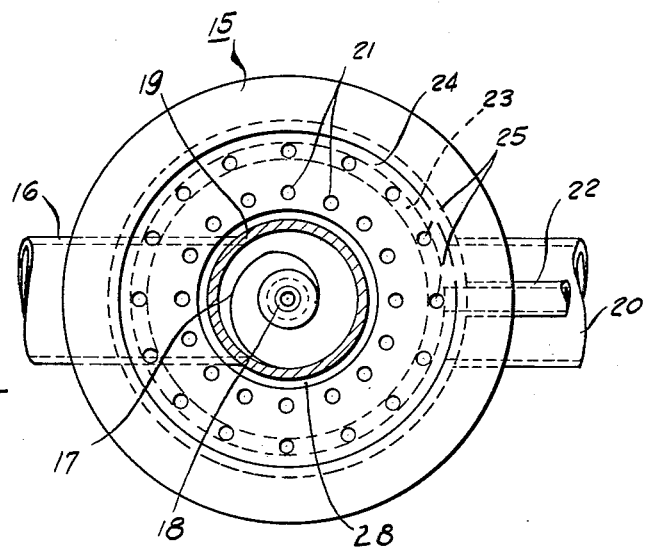
*Fig. III*
INVENTOR
WILLIAM A. PATTERSON
BY Lloyd F. Engle, Jr.
ATTORNEY

United States Patent Office 3,151,965
Patented Oct. 6, 1964

3,151,965
METHOD AND APPARATUS FOR PRODUCING
GLASS BEADS
William A. Patterson, Washington, Pa., assignor to Fort
Pitt Bridge Works, Pittsburgh, Pa., a corporation of
Pennsylvania
Filed Jan. 27, 1961, Ser. No. 85,423
5 Claims. (Cl. 65—21)

This invention relates to apparatus and method for producing glass beads having small diameter such as the glass beads employed in increasing reflectivity of coating materials. More particularly, this invention relates to apparatus for feeding ground glass or cullet into a heated chamber wherein the said ground glass is plasticized, spherulized, and cooled to solid glass beads, and the method for producing the said glass beads.

The apparatus and method in prior use in the art have primarily comprised the feeding of ground glass into a heated chamber and driving it upward therein with a draft of combustion gases as it is plasticized, spherulized, solidified and collected at the top of the said chamber. These apparati and methods produced a very large percentage of irregularly shaped glass beads because it was necessary to bear up the plasticized glass with a blast of combustion gases which distorted the shape of the plasticized glass by reason of the pressure and turbulence of the blast of combustion gases.

In certain other apparati and methods in prior use in the art, the ground glass was fed downward into a heated chamber. However, in none of these apparati and methods was any attempt made to accomplish a uniformity of feed. Basically, all of these apparati and methods comprised a mere dropping of the ground glass into and through the chamber. The disadvantage involved therein is comprised in the fact that a uniform chamber temperature cannot function effectively to plasticize and spherulize variable quantities of ground cullet.

In all of the apparati in prior use in the art, the turbulent draft within the chamber caused certain of the plasticized glass to strike the sides of the chamber and adhere thereto, eventually flowing downward and forming globules and "icicles." This necessitated that, after relatively short operation, the apparatus had to be shut down and the glass residue cleaned therefrom. This, of course, required that the apparatus be cooled and considerable production time was lost, because it was then necessary to reheat the chamber which generally comprises a large quantity of refractory material.

I have discovered that by employing a modified version of my feeding and heating apparatus, disclosed in United States Letters Patent No. 2,885,199, it is possible to obtain a high degree of shape uniformity in the glass beads produced by the practice of my method in my apparatus. I have further discovered that, by providing a curtain of low pressure air at a lesser temperature than the chamber temperature along the sides of the chamber, it is possible to prevent the plasticized glass from striking and adhering thereto.

I have examined the specifications of 32 States and turnpike commissions to determine the basic requirements as to size and uniformity of the glass beads used by them to increase the reflectivity of paint. A study of these requirements establishes that they are very exacting as regards size and uniformity of shape.

The following is a comparative average of the requirements as regards size:

| U.S. Standard Screen No.: | Percent passing |
|---|---|
| 20 | 100 |
| 30 | 80 to 95 |
| 50 | 18 to 35 |
| 100 | 0 to 10 |
| 200 | 0 to 2 |

It is of further importance to notice that all of the specifications require a proportionate range in the size of the glass beads used; that is to say, even though the said beads are quite small, it is required that they comprise a certain proportionate size range. It must be understood that, in using the term "small" with relation to glass beads herein, it is intended to mean those beads which will pass a U.S. Standard No. 20 screen.

In the apparati and methods in prior use in the art, the matter of obtaining an acceptable size range mixture of beads was, primarily, chance. By the use of my apparatus and method, I can critically control the final mixture of beads within the proper size range.

Therefore, one object of this invention is to provide an apparatus and method wherein small glass beads having a high degree of uniformity can be produced in commerical quantities. Another object of this invention is to provide an apparatus and method whereby a uniform feeding and heating of ground glass or cullet can be accomplished while yet retaining the facility for purposely varying the rate of feeding and heating the said cullet. A further object of this invention is to provide an apparatus and method wherein ground glass or cullet can be plasticized, spherulized, and solidified within a chamber without adhering to the sides thereof and forming globules or "icicles" thereon. A still further object of this invention is to provide an apparatus and method whereby a desired proportionate mixture of variable sized glass beads can be produced to meet the requirements of commercial users of glass beads for increasing the reflectivity of paints.

Referring now to the drawings:

FIG. I shows a cross-sectional elevation of the preferred embodiment of my apparatus for producing glass beads.

FIG. II shows a cross-sectional plan view of my apparatus taken in the plane of section line II—II of FIG. I.

FIG. III shows a cross-sectional view of the feeding and heating portion of my apparatus taken in the plane of section lines III—III of FIG. I.

The numeral 1 indicates generally the body of my apparatus having a refractory lining 2 and a hollow conical hearth 3. A blower 4 forces air through conduit 5 into the chamber of the hollow-hearth 3 where the air cools the said hearth 3 and is, in turn, heated thereby. The heated air then passes through the conduit 6 to the annular duct 7 and through the circumferentially spaced ports 8. The ports 8 are circumferentially spaced adjacent the inner walls of the chamber 9 defined within my apparatus and direct the heated air downward therealong. At the outlets 10 for combustion gases I provide a collection box 11 for the very fine beads which are carried thereinto by the combustion gases. The collection box 11 is provided with a draft regulator 12 and a metering gate 13. The stack 14 conducts the combustion gases to final exhaust.

The numeral 15 indicates generally the modified version of my feeding and heating apparatus. The ground glass or cullet is introduced through the inlet 16 into the helical screw feed 17 and is conveyed thereby to the lower end of the said crew where it is picked up by air or combustion supporting gas introduced through the tube 18, which passes longitudinally through the center of the screw 17, and is charged through the tubular screw housing extension 19 into the chamber 9. Additional air or combustion supporting gas is introduced through the tube 20 and passes through the circumferentially spaced ports 21 and the annular orifice 28. The fuel is introduced through the tube 22 into the annular duct 23 in the ring 24 and is discharged through the ports 25 disposed in circumferential spaced relation in the ring 24. The fuel mixed with the combustion supporting gas is ignited and forms an envelope of flame and combustion gases around the screw housing extension 19 and the air borne ground glass or cullet.

The blower 4 delivers air at the rate of approximately 1000 cubic feet per minute which cools the hearth and is heated thereby. The air, so heated, is then conveyed to the ports 8 and discharged to form a curtain of heated air along the walls of the chamber 9. This curtain prevents the glass, in the plasticized state, from adhering to and collecting on the walls of my apparatus. This is an important feature of novelty in my apparatus and solves a problem which has caused considerable difficulty in the prior art. Since the glass, in plastic condition, collected on the walls of apparatus in use in the prior art, it was necessary that those apparati be shut down periodically and the glass removed.

The air at inlet 18 is delivered at a pressure of approximately 3 ounces and also enters into the combustion so that the ground glass or cullet is entirely enveloped in the flame and combustion gases. The chamber temperatures in the upper portion of my apparatus range from 1800° F. to 2500° F. depending upon the size and constituency of the ground glass or cullet being fed and the rate of feed thereof. The maximum hearth temperature which I have experienced in my apparatus is approximately 500° F. when operating in the upper limits of the aforementioned range. Under these conditions, the chamber temperatures in my apparatus, from the hearth to the bottom of the outlets 10, range from 500° F. to 1500° F.

When the ground glass or cullet is exposed to the flame and hot combustion gases, it is plasticized almost immediately and spherulizes. As it drops through the chamber of my apparatus it solidifies and the larger beads fall to the hearth and are directed onto the conveyor 26. The majority of the smaller beads are carried by the draft through the outlets 10 and fall into the collection boxes 11, wherefrom they pass through the metering gates 13 onto the conveyor 26 at a controlled rate to mix with the larger beads.

It must be understood that the air, which I introduce to form the curtain along the walls of my chamber, is of a lesser temperature than that of the combustion gases. I have discovered that under these conditions the curtain air does not mingle with the combustion gases and preserves a curtain which is not penetrated by the spherulized glass.

In the experiments which I have performed with my apparatus, I have used gas as the fuel and I have determined that the fuel consumption of my apparatus is approximately 8 cubic feet of gas for each pound of cullet fed at maximum temperature and a production rate of 300 pounds of beads per hour. It is important to note that the rate of feed of my apparatus may be varied since the feed screw is engaged to the gear 27 which is driven by a variable speed motor (not shown). The rate of feed is often highly critical, depending upon the size and constituency of ground glass or cullet being fed.

Certain changes may be made in the arrangement set forth in the specifications and shown in the drawings, it being understood that modifications in the precise embodiment of the invention may be made within the scope of the following claims without departing from the spirit of the invention.

I claim as my invention:

1. Apparatus for producing glass beads, comprising a shell defining a vertically disposed chamber therein, mechanical operative means for downwardly charging ground cullet into said chamber and being mounted on the upper extremity of the said shell and communicating with the upwardly disposed end of said chamber, combustion means for downwardly directing flame and hot combustion gases around and within the said cullet and being disposed in circumferential spaced relation to the said mechanical operative means, a plurality of downwardly directed ports in the upper extremity of the said shell uniformly outwardly spaced from the said combustion means and communicating with the said chamber and uniformly disposed parallel to and inwardly adjacent the vertical sides of said chamber, and blower means for supplying air to said ports communicating with said ports.

2. The apparatus described in claim 1, wherein the mechanical operative means for charging cullet comprises a vertically disposed variable speed helical screw conveyor.

3. Apparatus for producing glass beads, comprising a shell lined with refractory material defining a vertically disposed chamber therein, a mechanically rotatable helical screw conveyor for downwardly charging ground cullet into said chamber and being mounted on the upper extremity of the said shell and communicating with the upwardly disposed end of said chamber, a tubular member depending from adjacent the lower extremity of the said screw conveyor and in non-engaging external concentric relation thereto, an air supply tube extending longitudinally through the said screw conveyor and terminating at the lower extremity of the said screw conveyor and disposed in non-engaging internal concentric relation thereto, a plurality of fuel ports disposed in external concentric spaced relation to the said screw conveyor adjacent the lower extremity thereof, a plurality of combustion supporting gas ports disposed in external concentric spaced relation to the said screw conveyor adjacent the lower extremity thereof, a plurality of downwardly directed ports in the upper extremity of the said refractory lining uniformly outwardly spaced from the said combustion supporting gas ports and communicating with the said chamber and uniformly disposed parallel to and inwardly adjacent the vertical sides of said chamber, blower means for supplying air to the said ports communicating with said ports, a hearth cooperating with the said shell and refractory material to define the lower extremity of the said chamber and having an opening therein for passage of the said glass beads therethrough, and at least one outlet for combustion gases communicating with the said chamber proximate the lower extremity thereof and extending through the said refractory material and shell.

4. The apparatus described in claim 3, wherein the hearth is double-walled comprising a compartment coextensive with the said hearth which compartment communicates with the said blower to receive air therefrom prior to communication with the said downwardly directed ports in the upper extremity of the said refractory lining.

5. The method of producing glass beads comprising the steps of charging ground cullet downwardly into a heated chamber, surrounding the said charged cullet with flame and hot combustion gases at the point of charge, raising the temperature of the said cullet sufficient to produce a plastic condition therein, maintaining the said cullet in the said plastic condition through sufficient free fall to permit the said plastic cullet to spherulize, providing a downwardly directed air curtain within the said chamber and circumferentially surrounding the free fall area of the said cullet in said plastic condition which air curtain is maintained parallel and adjacent to the vertical walls of said chamber and is outwardly spaced from the said flame and hot combustion gases, and cooling the said free falling cullet from the plastic condition to a solid condition in the said spherulized form.

References Cited in the file of this patent

UNITED STATES PATENTS

| | | |
|---|---|---|
| 2,044,680 | Gilbert | June 16, 1936 |
| 2,047,995 | Cardy et al. | July 21, 1936 |
| 2,421,902 | Neuschotz | June 10, 1947 |
| 2,572,484 | Howle et al. | Oct. 23, 1951 |
| 2,676,892 | McLaughlin | Apr. 27, 1954 |
| 2,838,881 | Plumat | June 17, 1958 |

FOREIGN PATENTS

| | | |
|---|---|---|
| 495,779 | Belgium | Sept. 16, 1950 |
| 1,161,396 | France | Mar. 24, 1958 |